United States Patent
Kawakami et al.

(10) Patent No.: US 9,389,527 B2
(45) Date of Patent: Jul. 12, 2016

(54) INORGANIC PARTICLE, ELECTROSTATIC CHARGE IMAGE DEVELOPING TONER, ELECTROSTATIC CHARGE IMAGE DEVELOPER, DEVELOPER CARTRIDGE, PROCESS CARTRIDGE, AND IMAGE FORMING APPARATUS

(71) Applicant: FUJI XEROX CO., LTD., Tokyo (JP)

(72) Inventors: Eiji Kawakami, Kanagawa (JP); Tetsuya Taguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 1 day.

(21) Appl. No.: 14/596,819

(22) Filed: Jan. 14, 2015

(65) Prior Publication Data

US 2015/0277253 A1    Oct. 1, 2015

(30) Foreign Application Priority Data

Mar. 25, 2014  (JP) .................................. 2014-062449

(51) Int. Cl.
| | |
|---|---|
| *C01B 33/159* | (2006.01) |
| *G03G 9/097* | (2006.01) |
| *G03G 9/08* | (2006.01) |
| *C01B 33/12* | (2006.01) |
| *C01B 33/14* | (2006.01) |

(52) U.S. Cl.
CPC ............ *G03G 9/0827* (2013.01); *C01B 33/126* (2013.01); *C01B 33/14* (2013.01); *G03G 9/09716* (2013.01); *G03G 9/09725* (2013.01); *Y10T 428/2982* (2015.01)

(58) Field of Classification Search
CPC . C01B 33/159; C01B 13/328; G01G 9/09708
See application file for complete search history.

(56) References Cited

U.S. PATENT DOCUMENTS

| | | | |
|---|---|---|---|
| 2013/0065170 A1* | 3/2013 | Kadokura .......... | G03G 15/0806 430/105 |
| 2013/0196259 A1* | 8/2013 | Iida ...................... | G03G 9/0804 430/105 |
| 2014/0057111 A1* | 2/2014 | Tomimatsu Fujimoto .............. | C01B 13/328 428/402 |

FOREIGN PATENT DOCUMENTS

JP          2012-068589 A       4/2012

* cited by examiner

*Primary Examiner* — Hoa V Le
(74) *Attorney, Agent, or Firm* — Oliff PLC

(57) ABSTRACT

An irregular shape inorganic particle satisfies the following formulas (1) and (2), $$1/17 \leq A/B \leq 1/13 \qquad (1)$$
$$1.2 \leq C/D \leq 1.5 \qquad (2)$$

wherein A represents a distance between the center of a circumscribed rectangle, in which lines sandwiching a projected image and being parallel to an absolute maximum length of the projected image of inorganic fine particles are long sides and lines sandwiching the projected image and being perpendicular to the absolute maximum length are short sides, and the center of gravity of the projected image, B represents the absolute maximum length, C represents a length of a long side of the circumscribed rectangle, and D represents a length of a short side of the circumscribed rectangle.

13 Claims, 4 Drawing Sheets

INORGANIC PARTICLE, ELECTROSTATIC CHARGE IMAGE DEVELOPING TONER, ELECTROSTATIC CHARGE IMAGE DEVELOPER, DEVELOPER CARTRIDGE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2014-062449 filed Mar. 25, 2014.

BACKGROUND

1. Technical Field

The present invention relates to an inorganic particle, an electrostatic charge image developing toner, an electrostatic charge image developer, a developer cartridge, a process cartridge, and an image forming apparatus.

2. Related Art

In recent years, along with the development of devices and enhancement of communication networks of information societies, an electrophotographic process is widely used not only in a copying machine, but in a network printer in an office, a printer for a personal computer, and an on-demand printer; and high quality, high speed, high reliability, miniaturization, weight reduction, and energy saving performance are strongly becoming more and more required, regardless of the printing being black and white or color.

Normally, in the electrophotographic process, a fixed image is formed by going through plural processes including, electrically forming a latent image (electrostatic charge image) on a photoreceptor (image holding member) obtained by using a photoconductive material by various units, developing this latent image by using a toner, transferring the toner image on the photoreceptor to a recording medium such as a paper or the like through or without an intermediate transfer member, and fixing this transferred image onto the recording medium.

SUMMARY

According to an aspect of the invention, there is provided an inorganic particle containing inorganic particles having irregular shape and satisfying the following formulas (1) and (2), $$1/17 \leq A/B \leq 1/13 \quad (1)$$

$$1.2 \leq C/D \leq 1.5 \quad (2)$$

wherein A represents a distance between the center of a circumscribed rectangle, in which lines sandwiching a projected image and being parallel to an absolute maximum length of the projected image of inorganic fine particles are long sides and lines sandwiching the projected image and being perpendicular to the absolute maximum length are short sides, and the center of gravity of the projected image, B represents the absolute maximum length, C represents a length of a long side of the circumscribed rectangle, and D represents a length of a short side of the circumscribed rectangle.

BRIEF DESCRIPTION OF THE DRAWINGS

Exemplary embodiments of the present invention will be described in detail based on the following figures, wherein.

DETAILED DESCRIPTION

Figure 1:
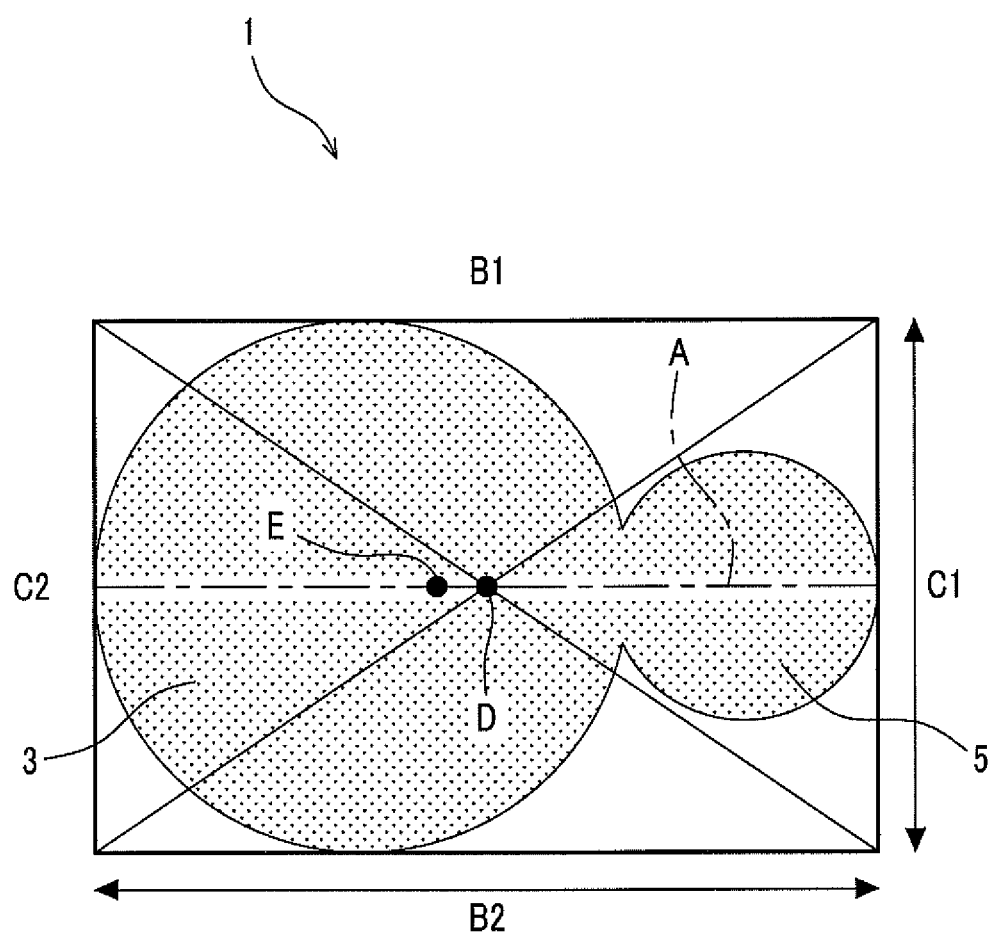
FIG. 1 is a diagram illustrating the center and the center of gravity of an irregular shape inorganic particle according to the exemplary embodiment.

Hereinafter, the irregular shape inorganic particle, the electrostatic charge image developing toner, the electrostatic charge image developer, the toner cartridge, the process cartridge, the image forming apparatus, and the image forming method of the present invention will be described in detail.

Irregular Shape Inorganic Particle

The irregular shape inorganic particle according to the exemplary embodiment satisfies the following conditions (1) and (2).

Condition (1): A distance between the center of a circumscribed rectangle, in which lines sandwiching a projected image and being parallel to an absolute maximum length of the projected image are long sides and lines sandwiching the projected image and being perpendicular to the absolute maximum length are short sides, and the center of gravity of the projected image is from $1/17$ to $1/13$ of the absolute maximum length.

Condition (2): A ratio (long side/short side) of a length of a long side and a length of a short side of the circumscribed rectangle is from 1.2 to 1.5.

In a case where the irregular shape inorganic particles according to the exemplary embodiment are used as an external additive of a toner, an occurrence of uneven wear on a surface of an image holding member may be prevented. The reason for this is not clear, however, it is thought to be as follows.

In order to remove an attached matter such as a resin component that is present on the surface of an image holding member with a cleaning blade using an abrasive as a kind of external additive of a toner, it is important to make the abrasive stay in a nip portion between the image holding member and the cleaning blade. It is useful that the abrasive is irregular shape in order to make the abrasive stay in the nip portion. However, when the abrasive particles are irregular shape, the abrasive particles may remain in a particular location, and thus, the existence distribution of the abrasive is localized with respect to the rotation axis direction of the image holding member, and distribution of polishing capability becomes uneven in some cases. As a result, there is a case where scratches are generated on the surface of the image holding member in a part in which the polishing capability becomes strong. As a result, uneven wear occurs on the surface of the image holding member.

In addition, when the abrasive particles are nearly spherical, the abrasive particles slip through the cleaning blade, and thus, the polishing effect is not exhibited.

In particular, in a case where a titanate compound, cerium oxide, or the like which is nearly spherical is used as the abrasive for refreshing the surface of the image holding member, the polishing capability of these abrasives is high, and thus, scratches are likely to occur.

Because the irregular shape inorganic particles according to the exemplary embodiment satisfy the above conditions (1)

and (2), the center of a particle and the center of gravity of a particle do not match. Since the center of gravity of the particle and the center of a particle do not match, the particles in the nip portion are likely to move in the rotation axis direction of the image holding member without staying at one place. Therefore, the particles are likely to be distributed with respect to the rotation axis direction of the image holding member, and it is possible to non-locally polish the surface of the image holding member. Therefore, it is considered that an occurrence of uneven wear on the surface of the image holding member is prevented.

In the above-described condition (1), the distance between the center of the circumscribed rectangle and the center of gravity of the projected image is within a range from $1/17$ to $1/13$ of the absolute maximum length, and preferably within a range from $1/15$ to $1/14$. When the distance between the center of the circumscribed rectangle and the center of gravity of the projected image is less than $1/17$ of the absolute maximum length, the distance between the center of the circumscribed rectangle and the center of gravity is too short, and the particles in the nip portion are less likely to move in the rotation axis direction of the image holding member. Therefore, there is a case where scratches are generated on the surface of the image holding member in a part in which the polishing capability becomes strong. As a result, uneven wear may occur on the surface of the image holding member. On the other hand, it is difficult to obtain particles having the distance between the center of the circumscribed rectangle and the center of gravity of the projected image greater than $1/13$ of the absolute maximum length.

In the above-described condition (2), the ratio (long side/short side) of a length of a long side and a length of a short side of the circumscribed rectangle is from 1.2 to 1.5, and preferably within a range from 1.3 to 1.5. When the ratio (long side/short side) of a length of a long side and a length of a short side of the circumscribed rectangle is greater than 1.5, the shape of the particles becomes a rod shape, and the particles in the nip portion is less likely to move in the rotation axis direction of the image holding member. Therefore, there is a case where scratches are generated on the surface of the image holding member in a part in which the polishing capability becomes strong. As a result, uneven wear may occur on the surface of the image holding member. On the other hand, it is difficult to obtain particles having the ratio (long side/short side) of a length of a long side and a length of a short side of the circumscribed rectangle less than 1.2, while satisfying the above-described condition (1).

FIG. 1 is a diagram illustrating the center of an irregular shape inorganic particle and the center of gravity of an irregular shape inorganic particle according to the exemplary embodiment. In FIG. 1, the shape of a particle 1 is illustrated as a projected image by a projection method. Lines sandwiching the projected image and being parallel to an absolute maximum length A of the projected image of the particle 1 are long sides B1 and B2. In addition, lines sandwiching the projected image and being perpendicular to the absolute maximum length A are short sides C1 and C2. The circumscribed rectangle of the projected image is defined by the long sides B1 and B2, and the short sides C1 and C2. When the center of the circumscribed rectangle is defined as D and the center of gravity of the projected image is defined as E, in the exemplary embodiment, a distance DE is from $1/17$ to $1/13$ of the absolute maximum length A. In addition, in the exemplary embodiment, the ratio (long side/short side) of a length of a long side B1 (or B2) and a length of a short side C1 (or C2) is from 1.2 to 1.5.

In the exemplary embodiment, an absolute maximum length of particles, a distance between the center of a circumscribed rectangle and the center of gravity of a projected image, and a length of a long side and a length of a short side of the circumscribed rectangle are calculated by the following method.

First, the irregular shape inorganic particles are placed on a smooth stand, and vibrated so as to be evenly dispersed. Then, after the dispersed irregular shape inorganic particles are transferred to a SEM stand to which a conductive tape is attached, an observation image is taken at 60000 times magnification using a scanning electron microscope "FE-SEM S-4700" (manufactured by Hitachi High-Technologies Corporation), then, by analyzing the observation image by a shape feature analysis using image analysis software "WIN ROOF" (manufactured by Mitani Corporation), an absolute maximum length of particles, coordinates of the center of the circumscribed rectangle, and coordinates of the center of gravity are calculated, and a distance between the center and the center of gravity is calculated from the coordinates. The above operations are performed on 500 particles of the irregular shape inorganic particles, and the average value thereof is calculated.

The shape of the irregular shape inorganic particles according to the exemplary embodiment is not particularly limited as long as it satisfies the above conditions (1) and (2). The shape of the irregular shape inorganic particles according to the exemplary embodiment may be a shape in which a first granular portion and a second granular portion are integrated. In FIG. 1, a particle 1 is configured by integration of a first granular portion 3 and a second granular portion 5.

In a case where the shape of the irregular shape inorganic particles according to the exemplary embodiment is a shape in which the first granular portion and the second granular portion are integrated, a ratio (first granular portion/second granular portion) of a particle diameter of the first granular portion and a particle diameter of the second granular portion is preferably from 2 to 4, and more preferably from 2.5 to 3.5. When the ratio (first granular portion/second granular portion) of a particle diameter of the first granular portion and a particle diameter of the second granular portion is from 2 to 4, the irregular shape inorganic particles are likely to satisfy the above conditions (1) and (2).

An average equivalent circle diameter of the irregular shape inorganic particles according to the exemplary embodiment is preferably from 0.05 μm to 1.5 μm, more preferably from 0.2 μm to 1.5 μm, and still more preferably from 0.5 μm to 1.5 μm.

In the exemplary embodiment, the average equivalent circle diameter of the irregular shape inorganic particles is determined by the following method.

First, the irregular shape inorganic particles are placed on a smooth surface, and vibrated so as to be evenly dispersed. Regarding 1000 particles of the irregular shape inorganic particles, an equivalent circle diameter D of a surface viewed from above is measured at 1000 times magnification using a color laser microscope "VK-9700" (manufactured by Keyence Corporation), and by determining the arithmetic average value thereof, the average equivalent circle diameter is calculated.

The method for preparing the irregular shape inorganic particles according to the exemplary embodiment is not particularly limited. An example of the method for preparing the irregular shape inorganic particles according to the exemplary embodiment will be described using silica particles as an example below.

The method for preparing the irregular shape silica particles which are an example of the irregular shape inorganic particles according to the exemplary embodiment, for example, may have a process (hereinafter, referred to as "alkali catalyst solution preparing process" in some cases) of preparing an alkali catalyst solution including an alkali catalyst at a concentration from 0.6 mol/L to 0.85 mol/L in a solvent including alcohol, and a process (hereinafter, referred to as "particle forming process" in some cases) of supplying tetraalkoxysilane to the alkali catalyst solution and supplying an alkali catalyst from 0.1 moles to 0.4 moles with respect to 1 mole of the total supply amount of tetraalkoxysilane supplied per minute.

That is, the method for preparing the silica particles according to the exemplary embodiment is a method in which in the presence of alcohol including the alkali catalyst of the above-described concentration, while respectively supplying tetraalkoxysilane which is a raw material and separately, the alkali catalyst which is a catalyst in the above relationship, tetraalkoxysilane is allowed to undergo a reaction, and thereby, silane particles are formed.

Each process will be described below.

First, the alkali catalyst solution preparing process will be described.

The alkali catalyst solution preparing process is a process of preparing a solvent containing alcohol, and adding the alkali catalyst thereto to prepare an alkali catalyst solution.

The solvent including alcohol may be formed only of alcohol, or as necessary, may be a mixed solvent of alcohol and other solvents such as water, ketones (for example, acetone, methyl ethyl ketone, and methyl isobutyl ketone), cellosolves (for example, methyl cellosolve, ethyl cellosolve, butyl cellosolve, and cellosolve acetate), and ethers (for example, dioxane and tetrahydrofuran). In a case of the mixed solvent, the amount of alcohol with respect to the other solvents may be equal to or greater than 80% by weight (preferably equal to or greater than 90% by weight).

Moreover, examples of the alcohol include lower alcohols such as methanol and ethanol.

On the other hand, the alkali catalyst is a catalyst for promoting the reaction of the tetraalkoxysilane (hydrolysis reaction or condensation reaction), and examples thereof include basic catalysts such as ammonia, urea, monoamine, and a quaternary ammonium salt, and ammonia is particularly desirable.

The concentration (content) of the alkali catalyst is preferably from 0.6 mol/L to 0.85 mol/L, more preferably from 0.63 mol/L to 0.78 mol/L, and still more preferably from 0.66 mol/L to 0.75 mol/L.

Moreover, the concentration of the alkali catalyst is a concentration with respect to the alcohol catalyst solution (solvent including the alkali catalyst and alcohol).

Next, the particle forming process will be described.

The particle forming process is a process of respectively supplying tetraalkoxysilane and an alkali catalyst to an alkali catalyst solution and allowing tetraalkoxysilane to undergo a reaction (hydrolysis reaction or condensation reaction) in the alkali catalyst solution to form silica particles.

In the particle forming process, the silica particles are formed by forming nuclear particles by the reaction of tetraalkoxysilane at an initial stage of supplying tetraalkoxysilane (nuclear particle forming stage) and then, growing the nuclear particles (nuclear particle growth stage).

Examples of tetraalkoxysilane supplied to the alkali catalyst solution include tetramethoxysilane, tetraethoxysilane, tetrapropoxysilane, and tetrabutoxysilane, and tetramethoxysilane and tetraethoxysilane are favorable from the viewpoint of controlability of a reaction rate, or a shape, a particle diameter, a particle size distribution, or the like of the obtained silica particles.

The supply amount of tetraalkoxysilane, for example, may be from 0.001 mol/(mol·min) to 0.01 mol/(mol·min), is preferably from 0.002 mol/(mol·min) to 0.009 mol/(mol·min), and more preferably from 0.003 mol/(mol·min) to 0.008 mol/(mol·min) with respect to a molar number of alcohol in the alkali catalyst solution.

When the supply amount of tetraalkoxysilane is within the above range, an occurrence of coarse aggregates is low, and silica particles having irregular shapes are likely to be formed.

Moreover, the supply amount of tetraalkoxysilane shows a molar number of tetraalkoxysilane supplied per minute with respect to 1 mole of alcohol in the alkali catalyst solution.

On the other hand, as the alkali catalyst supplied to the alkali catalyst solution, alkali catalysts exemplified above may be exemplified. The alkali catalyst supplied may be the same as or different from the alkali catalyst that is contained in the alkali catalyst solution in advance, but may preferably be the same as the alkali catalyst.

The supply amount of the alkali catalyst is preferably from 0.1 moles to 0.4 moles, more preferably from 0.14 moles to 0.35 moles, and still more preferably from 0.18 moles to 0.3 moles with respect to 1 mole of the total supply amount of tetraalkoxysilane supplied per minute.

Here, although, in the particle forming process, tetraalkoxysilane and the alkali catalyst are respectively supplied to the alkali catalyst solution, the supply method may be a method for continuously supplying the materials, or may be a method for intermittently supplying the materials.

In addition, in the particle forming process, the temperature of the alkali catalyst solution (temperature during supply), for example, may be from 5° C. to 50° C., and is preferably in a range from 15° C. to 40° C.

In a case where the irregular shape silica particles which are an example of the irregular shape inorganic particles according to the exemplary embodiment has a shape in which the first granular portion and the second granular portion are integrated, irregular shape silica in which the first granular portion and the second granular portion having different particle diameters from each other are integrated may be obtained by mixing two types of silica particles having different average particle diameters obtained through the above process. As the method for integrating the both by mixing the two types of silica particles having different average particle diameters from each other and bonding the silica particles to each other, a method in which a dispersion including the first granular portion and a dispersion including the second granular portion are mixed, then, a condensation catalyst such as a metal salt (Ti, Zr, Zn, Al, or the like) is added thereto, and the mixture is stirred, whereby irregular shape silica in which the first granular portion and the second granular portion are integrated is obtained may be exemplified.

Through the processes described above, silica particles are obtained. In this state, the obtained silica particles are obtained in the state of a dispersion, but may be used as a dispersion of the silica particles as is, or as a powder of the silica particles extracted by removing the solvent.

In a case of being used as a silica particle dispersion, as necessary, the solid concentration of silica particles may be adjusted by diluting the dispersion with water or alcohol or by concentrating the dispersion. In addition, the silica particle dispersion may be used by substituting the solvent with water-soluble organic solvents such as other alcohols, esters, or ketones.

On the other hand, in a case of being used as a powder of the silica particles, it is necessary to remove the solvent from the silica particle dispersion, and examples of the method for removing the solvent include known methods such as 1) a method for removing the solvent by filtration, centrifugal separation, distillation, or the like, and then drying the resultant product by a vacuum dryer, a tray dryer, or the like, and 2) a method for directly drying a slurry by a fluidized bed dryer, a spray dryer, or the like. The drying temperature is not particularly limited, but is preferably equal to or lower than 200° C. When the drying temperature is higher than 200° C., it is likely to cause bonding among the primary particles or generation of coarse particles due to the condensation of a silanol group remaining on the surface of the silica particles.

The dried silica particles may preferably be crushed or sieved to remove coarse particles or aggregates therefrom, as necessary. The crushing method is not particularly limited, and may be performed, for example, by a dry pulverizer such as a jet mill, a vibration mill, a ball mill, or a pin mill. The sieving method may be performed, for example, by known devices, such as a vibration sieve or a wind classifier.

The silica particles obtained by the method for preparing the silica particles according to the exemplary embodiment may be used after the surface of the silica particles is subjected to a treatment with a hydrophobizing agent.

Examples of the hydrophobizing agent include known organic silicon compounds having an alkyl group (for example, a methyl group, an ethyl group, a propyl group, or a butyl group). Specific examples thereof include silazane compounds (for example, silane compounds such as methyltrimethoxysilane, dimethyldimethoxysilane, trimethylchlorosilane, and trimethylmethoxysilane, hexamethyldisilazane, and tetramethyldisilazane). The hydrophobizing agents may be used singly or in combination of two or more kinds thereof.

Among these hydrophobizing agents, organic silicon compounds having a trimethyl group such as trimethylmethoxysilane or hexamethyldisilazane are suitable.

The amount of the hydrophobizing agent used is not particularly limited, and in order to obtain a hydrophobization effect, for example, the amount is from 1% by weight to 100% by weight, and preferably from 5% by weight to 80% by weight with respect to the silica particles.

As the method for obtaining a hydrophobic silica particle dispersion subjected to a hydrophobization treatment with a hydrophobizing agent, for example, a method in which the amount of a hydrophobizing agent required is added to a silica particle dispersion, and by reacting the mixture in a temperature range from 30° C. to 80° C. under stirring, a hydrophobization treatment is performed on silica particles, whereby a hydrophobic silica particle dispersion is obtained may be exemplified. When the reaction temperature is lower than 30° C., the hydrophobization reaction is less likely to progress, and when the reaction temperature is higher than 80° C., gelation of the dispersion by self-condensation of a hydrophobizing agent or aggregation of the silica particles is likely to occur, in some cases.

On the other hand, examples of the method for obtaining the powdery hydrophobic silica particles include a method in which after a hydrophobic silica particle dispersion is obtained by the above method, the hydrophobic silica particle dispersion is dried by the above method, whereby powder of the hydrophobic silica particles is obtained, a method in which after powder of hydrophilic silica particles is obtained by drying a silica particle dispersion, a hydrophobization treatment is performed by adding a hydrophobizing agent, whereby powder of the hydrophobic silica particles is obtained, and a method in which after a hydrophobic silica particle dispersion is obtained, and powder of hydrophobic silica particles is obtained by drying, a hydrophobization treatment is performed by further adding a hydrophobizing agent, whereby powder of the hydrophobic silica particles is obtained.

Here, as the method for hydrophobization-treating powdery silica particles, a method in which powdery hydrophilic silica particles are stirred in a treatment tank such as a Henschel mixer or a fluidized bed, then, a hydrophobizing agent is added thereto, and the hydrophobizing agent is vaporized by heating the inside of the treatment tank, thereby the hydrophobizing agent in a vapor state reacts with silanol groups on the surface of the powdery silica particles may be exemplified. The treatment temperature, which is not particularly limited, for example, may be from 80° C. to 300° C., and is preferably from 120° C. to 200° C.

In a case where the irregular shape inorganic particles according to the exemplary embodiment are particles other than the silica particles, an example of the preparation method thereof is a follows: by mixing two types of inorganic particles having different average particle diameters, irregular shape inorganic particles in which the first granular portion and the second granular portion having different particle diameters from each other are integrated may be obtained. As the method for integrating the both by mixing the two types of inorganic particles having different average particle diameters from each other and bonding the inorganic particles to each other, for example, a method in which the surface of inorganic particles are coated with a resin, then, the coated inorganic particles are heated and aggregated at the temperature of the softening point of the coating resin, about −5° C., and the resultant product is crushed with a moderate shearing force may be exemplified.

Examples of materials other than silica configuring the irregular shape inorganic particles according to the exemplary embodiment include $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O.(TiO_2)n$, $Al_2O_3.2SiO_2$, $CaCO_3$, $MgCO_3$, $BaSO_4$, and $MgSO_4$.

Electrostatic Charge Image Developing Toner

The electrostatic charge image developing toner according to the exemplary embodiment (hereinafter, referred to as "the toner according to the exemplary embodiment") includes toner particles and an external additive including the irregular shape inorganic particles according to the exemplary embodiment, and the proportion of the irregular shape inorganic particles according to the exemplary embodiment in the external additive is equal to or greater than 50% by number. The theoretical upper limit value is 100% by number. The proportion of the irregular shape inorganic particles according to the exemplary embodiment in the external additive is preferably from 50% by number to 80% by number, and more preferably from 60% by number to 75% by number.

When the proportion of the irregular shape inorganic particles according to the exemplary embodiment in the external additive is less than 50% by number, the existence distribution of the irregular shape inorganic particles is localized with respect to the rotation axis direction of an image holding member.

A method for calculating the proportion of the irregular shape inorganic particles according to the exemplary embodiment in the external additive is as follows.

After an observation image of the toner surface is taken at 60000 times magnification using a scanning electron microscope "FE-SEM S-4700" (manufactured by Hitachi High-Technologies Corporation), the observation image is analyzed by a shape feature analysis using image analysis software "WIN ROOF" (manufactured by Mitani Corporation), then, the irregular shape inorganic particles and other external additives are separated, and a ratio per 1,000 particles is calculated.

Examples of the external additive include resin particles (resin particles such as polystyrene particles, PMMA particles, and melamine resin particles), cleaning aids (for example, metal salts of higher fatty acids represented by zinc stearate and particles of a fluorine high molecular weight material), and the like.

The amount of an external additive externally added, for example, is preferably from 0.01% by weight to 5% by weight, and more preferably from 0.01% by weight to 2.0% by weight with respect to the toner particles.

Toner Particles

For example, the toner particles are configured to include a binder resin, and as necessary, a colorant, a release agent, and other additives.

Binder Resin

As the binder resin, vinyl resins consisting of homopolymers of monomers such as styrenes (for example, styrene, parachlorostyrene, and α-methyl styrene), (meth) acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (for example, acrylonitrile and methacrylonitrile), vinyl ethers (for example, vinyl methyl ether and vinyl isobutyl ether), vinyl ketones (vinyl methyl ketone, vinyl ethyl ketone, and vinyl isopropenyl ketone), and olefins (for example, ethylene, propylene, and butadiene), or copolymers obtained by combining two or more types of these monomers may be exemplified.

Examples of the binder resin include non-vinyl resins such as an epoxy resin, a polyester resin, a polyurethane resin, a polyamide resin, a cellulose resin, a polyether resin, and modified rosin, mixtures of these and the above-described vinyl resins, or, graft polymers obtained by polymerizing vinyl monomers in the coexistence of these.

These binder resins may be used alone or in combination of two or more kinds thereof.

The glass transition temperature (Tg) of the binder resin is preferably from 50° C. to 80° C., and more preferably from 50° C. to 65° C.

Moreover, the glass transition temperature is determined by a DSC curve obtained by differential scanning calorimetry (DSC), and more specifically, is determined by "an extrapolated glass transition starting temperature" described in a method for determining a glass transition temperature of "testing methods for transition temperatures of plastics" in JIS K-7121-1987.

The weight average molecular weight (Mw) of the binder resin is preferably from 5,000 to 1,000,000, and more preferably from 7,000 to 500,000.

The number average molecular weight (Mn) of the binder resin is preferably from 2,000 to 100,000.

The molecular weight distribution (Mw/Mn) of the binder resin is preferably from 1.5 to 100, and more preferably from 2 to 60.

Moreover, the weight average molecular weight and the number average molecular weight are measured by Gel Permeation Chromatography (GPC). In the molecular weight measurement by GPC, HLC-8120 GPC which is GPC manufactured by Tosoh Corporation is used as a measurement apparatus, TSKGEL SUPER HM-M (15 cm) manufactured by Tosoh Corporation is used as a column, and a THF solvent is used. The weight average molecular weight and the number average molecular weight are calculated using a molecular weight calibration curve prepared by monodisperse polystyrene standard samples from the measurement results.

The content of the binder resin, for example, is preferably from 40% by weight to 95% by weight, more preferably from 50% by weight to 90% by weight, and still more preferably from 60% by weight to 85% by weight with respect to the total toner particles.

Colorant

Examples of the colorant include various pigments such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate, or various dyes such as an acridine dye, a xanthene dye, an azo dye, a benzoquinone dye, an azine dye, an anthraquinone dye, a thioindigo dye, a dioxazine dye, a thiazine dye, an azomethine dye, an indigo dye, a phthalocyanine dye, an aniline black dye, a polymethine dye, a triphenylmethane dye, a diphenylmethane dye, and a thiazole dye.

The colorants may be used alone or two or more types may be used in combination.

As the colorant, a surface-treated colorant may be used as necessary, or the colorant may be used in combination with a dispersing agent. In addition, plural types of colorant may be used in combination.

The content of the colorant, for example, is preferably from 1% by weight to 30% by weight, and more preferably from 3% by weight to 15% by weight with respect to the total toner particles.

Release Agent

Examples of the release agent include hydrocarbon waxes; natural waxes such as a carnauba wax, a rice wax, and a candelilla wax; synthetic or mineral petroleum waxes such as a montan wax; ester waxes such as fatty acid ester and montanic acid ester; and the like. However, the release agent is not limited thereto.

The melting temperature of the release agent is preferably from 50° C. to 110° C., and more preferably from 60° C. to 100° C.

Moreover, the melting temperature is determined by "a melting peak temperature" described in a method for determining a melting temperature of "testing methods for transition temperatures of plastics" in JIS K-7121-1987 from a DSC curve obtained by differential scanning calorimetry (DSC).

The content of the release agent, for example, is preferably from 1% by weight to 20% by weight, and more preferably from 5% by weight to 15% by weight with respect to the total toner particles.

Other Additives

As other additives, known additives such as a magnetic material, a charge-controlling agent, inorganic powder, and the like may be exemplified. These additives are included in toner particles as an internal additive.

Characteristics of Toner Particles

The toner particles may be toner particles having a single-layer structure, or toner particles having a so-called core/shell structure configured of a core (core particle) and a coating layer (shell layer) coated on the core.

Here, the toner particles having a core/shell structure may preferably be configured to have a core configured to include a binder resin and as necessary, other additives such as a colorant and a release agent, and a coating layer configured to include a binder resin.

The volume average particle diameter (D50v) of the toner particles is preferably from 2 μm to 10 μm, and more preferably from 4 μm to 8 μm.

Moreover, various average particle diameters and various particle size distribution indices of the toner particles is measured using a COULTER MULTISIZER II (manufactured by Beckman Coulter, Inc.), and ISOTON-II (manufactured by Beckman Coulter, Inc.) as an electrolyte.

In the measurement, from 0.5 mg to 50 mg of a measurement sample is added to 2 ml of a 5% aqueous solution of surfactant (preferably sodium alkylbenzene sulfonate) as a dispersing agent. The obtained material is added to 100 ml to 150 ml of the electrolyte.

The electrolyte in which the sample is suspended is subjected to a dispersion treatment using an ultrasonic disperser for 1 minute, and a particle size distribution of particles having a particle diameter from 2 μm to 60 μm is measured by a COULTER MULTISIZER II using an aperture having an aperture diameter of 100 μm. Moreover, 50,000 particles are sampled.

Cumulative distributions by volume and by number are drawn from the side of the smallest diameter with respect to particle size ranges (channels) separated based on the measured particle size distribution. The particle diameter when the cumulative percentage becomes 16% is defined as that corresponding to a volume particle diameter D16v and a number particle diameter D16p, while the particle diameter when the cumulative percentage becomes 50% is defined as that corresponding to a volume average particle diameter D50v and a cumulative number average particle diameter D50p. Furthermore, the particle diameter when the cumulative percentage becomes 84% is defined as that corresponding to a volume particle diameter D84v and a number particle diameter D84p.

Using these, a volume average particle size distribution index (GSDv) is calculated as $(D84v/D16v)^{1/2}$, while a number average particle size distribution index (GSDp) is calculated as $(D84p/D16p)^{1/2}$.

The shape factor SF1 of the toner particles is preferably from 110 to 150, and more preferably from 120 to 140.

Moreover, the shape factor SF1 is obtained through the following expression.

$$SF1=(ML^2/A)\times(\pi/4)\times100 \quad \text{Expression}$$

In the above expression, ML represents an absolute maximum length of a toner particle, and A represents a projected area of a toner particle.

Specifically, the shape factor SF1 is numerically converted mainly by analyzing a microscopic image or a scanning electron microscopic (SEM) image by the use of an image analyzer, and is calculated as follows. That is, an optical microscopic image of particles scattered on a surface of a glass slide is input to an image analyzer LUZEX (manufactured by Nireco Corporation) through a video camera to obtain maximum lengths and projected areas of 100 particles, values of SF1 are calculated through the above expression, and an average value thereof is obtained.

Method for Preparing Toner

Next, a method for preparing a toner according to the exemplary embodiment will be described.

The toner according to the exemplary embodiment is obtained by externally adding an external additive to toner particles after the toner particles are prepared.

The toner particles may be prepared using any of a dry method (for example, kneading and pulverizing method) and a wet method (for example, aggregation and coalescence method, suspension and polymerization method, and dissolution and suspension method). The method for preparing toner particle is not particularly limited to these methods, and a known method is employed.

Specifically, for example, when the toner particles are prepared by an aggregation and coalescence method, the toner particles are prepared through the processes of: preparing a resin particle dispersion in which resin particles as a binder resin are dispersed (resin particle dispersion preparation process); aggregating the resin particles (if necessary, other particles) in the resin particle dispersion (if necessary, in the dispersion after mixing with other particle dispersions) to form aggregated particles (aggregated particle forming process); and heating the aggregated particle dispersion in which the aggregated particles are dispersed, to coalesce the aggregated particles, whereby toner particles are formed (coalescence process).

Hereinafter, each process will be described in detail.

Moreover, in the following description, a method for obtaining toner particles including a colorant and a release agent will be described, and the colorant and the release agent are those used as necessary. Other additives other than the colorant and the release agent may also be used.

Resin Particle Dispersion Preparation Process

First, for example, a colorant particle dispersion in which colorant particles are dispersed and a release agent particle dispersion in which release agent particles are dispersed are prepared together with a resin particle dispersion in which resin particles as a binder resin are dispersed.

Herein, the resin particle dispersion is prepared by, for example, dispersing resin particles by a surfactant in a dispersion medium.

Examples of the dispersion medium used for the resin particle dispersion include aqueous mediums.

Examples of the aqueous mediums include water such as distilled water and ion exchange water, and alcohol. These may be used alone or in combination of two or more kinds thereof.

Examples of the surfactant include anionic surfactants such as sulfuric ester salt, sulfonate, phosphate ester, and soap anionic surfactants; cationic surfactants such as amine salt and quaternary ammonium salt cationic surfactants; and nonionic surfactants such as polyethylene glycol, alkyl phenol ethylene oxide adduct, and polyol nonionic surfactants. Among these, anionic surfactants and cationic surfactants are particularly used. Nonionic surfactants may be used in combination with anionic surfactants or cationic surfactants.

The surfactants may be used alone or in combination of two or more kinds thereof.

Regarding the resin particle dispersion, as a method for dispersing the resin particles in the dispersion medium, a common dispersing method using, for example, a rotary shearing-type homogenizer, or a ball mill, a sand mill, or a DYNO mill having media is exemplified. In addition, depending on the type of the resin particles, resin particles may be dispersed in the resin particle dispersion using, for example, a phase inversion emulsification method.

The phase inversion emulsification method includes: dissolving a resin to be dispersed in a hydrophobic organic solvent in which the resin is soluble; conducting neutralization by adding a base to an organic continuous phase (O phase); and converting the resin (so-called phase inversion) from W/O to O/W by putting an aqueous medium (W phase)

to form a discontinuous phase, thereby dispersing the resin as particles in the aqueous medium.

The volume average particle diameter of the resin particles dispersed in the resin particle dispersion is, for example, preferably from 0.01 µm to 1 µm, more preferably from 0.08 µm to 0.8 µm, and still more preferably from 0.1 µm to 0.6 µm.

Moreover, regarding the volume average particle diameter of the resin particles, a cumulative distribution by volume is drawn from the side of the smallest diameter with respect to particle size ranges (channels) separated using the particle size distribution obtained by the measurement of a laser diffraction-type particle size distribution measuring apparatus (for example, LA-700, manufactured by Horiba, Ltd.), and a particle diameter when the cumulative percentage becomes 50% with respect to the entirety of the particles is measured as a volume average particle diameter D50v. Moreover, the volume average particle diameter of the particles in other dispersions is also measured in the same manner.

The content of the resin particles included in the resin particle dispersion is, for example, preferably from 5% by weight to 50% by weight, and more preferably from 10% by weight to 40% by weight.

Moreover, for example, the colorant particle dispersion and the release agent particle dispersion are also prepared in the same manner as in the case of the resin particle dispersion. That is, the particles in the resin particle dispersion are the same as the colorant particles dispersed in the colorant particle dispersion and the release agent particles dispersed in the release agent particle dispersion, in terms of the volume average particle diameter, the dispersion medium, the dispersing method, and the content of the particles.

Aggregated Particle Forming Process

Next, the colorant particle dispersion and the release agent particle dispersion are mixed together with the resin particle dispersion.

The resin particles, the colorant particles, and the release agent particles are heterogeneously aggregated in the mixed dispersion, thereby forming aggregated particles having a diameter near a target toner particle diameter and including the resin particles, the colorant particles, and the release agent particles.

Specifically, for example, an aggregating agent is added to the mixed dispersion and a pH of the mixed dispersion is adjusted to acidity (for example, the pH is from 2 to 5). If necessary, a dispersion stabilizer is added. Then, the mixed dispersion is heated at a temperature of the glass transition temperature of the resin particles (specifically, for example, from a temperature 30° C. lower than the glass transition temperature of the resin particles to a temperature 10° C. lower than the glass transition temperature) to aggregate the particles dispersed in the mixed dispersion, thereby forming the aggregated particles.

In the aggregated particle forming process, for example, the aggregating agent may be added at room temperature (for example, 25° C.) under stirring of the mixed dispersion using a rotary shearing-type homogenizer, the pH of the mixed dispersion may be adjusted to acidity (for example, the pH is from 2 to 5), a dispersion stabilizer may be added if necessary, and the heating may then be performed.

Examples of the aggregating agent include a surfactant having an opposite polarity to the polarity of the surfactant used as the dispersing agent to be added to the mixed dispersion, such as inorganic metal salts and di- or higher-valent metal complexes. Particularly, when a metal complex is used as the aggregating agent, the amount of the surfactant used is reduced and charging characteristics are improved.

If necessary, an additive may be used which forms a complex or a similar bond with the metal ions of the aggregating agent. A chelating agent is preferably used as the additive.

Examples of the inorganic metal salts include metal salts such as calcium chloride, calcium nitrate, barium chloride, magnesium chloride, zinc chloride, aluminum chloride, and aluminum sulfate, and inorganic metal salt polymers such as polyaluminum chloride, polyaluminum hydroxide, and calcium polysulfide.

A water-soluble chelating agent may be used as the chelating agent. Examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added is, for example, preferably from 0.01 parts by weight to 5.0 parts by weight, and more preferably equal to or greater than 0.1 parts by weight and less than 3.0 parts by weight with respect to 100 parts by weight of the resin particles.

Coalescence Process Next, the aggregated particle dispersion in which the aggregated particles are dispersed is heated at, for example, a temperature that is equal to or higher than the glass transition temperature of the resin particles (for example, equal to or higher than a temperature that is 10° C. to 30° C. higher than the glass transition temperature of the resin particles) to coalesce the aggregated particles and form toner particles.

Toner particles are obtained through the above processes.

Toner particles may be prepared through the processes of: after the aggregated particle dispersion in which the aggregated particles are dispersed is obtained, further mixing the resin particle dispersion in which the resin particles are dispersed with the aggregated particle dispersion to conduct aggregation so that the resin particles further attach to the surfaces of the aggregated particles, thereby forming second aggregated particles; and coalescing the second aggregated particles by heating the second aggregated particle dispersion in which the second aggregated particles are dispersed, thereby forming toner particles having a core/shell structure.

After the coalescence process ends, the toner particles formed in the solution are subjected to a washing process, a solid-liquid separation process, and a drying process, that are well known, and thus dry toner particles are obtained.

In the washing process, preferably, displacement washing using ion exchange water is sufficiently performed from the viewpoint of charging properties. In addition, the solid-liquid separation process is not particularly limited, but suction filtration, pressure filtration, or the like may preferably be performed from the viewpoint of productivity. The method for the drying process is also not particularly limited, but freeze drying, flash jet drying, fluidized drying, vibration-type fluidized drying, or the like may preferably be performed from the viewpoint of productivity.

The toner according to the exemplary embodiment is prepared by, for example, adding and mixing an external additive with dry toner particles that have been obtained. The mixing may preferably be performed with, for example, a V-blender, a HENSCHEL MIXER, a LÖDIGE MIXER, or the like. Furthermore, if necessary, coarse toner particles may be removed using a vibration sieving machine, a wind classifier, or the like.

The kneading and pulverizing method is a method for mixing each material such as the binder resin and then molten kneading the material using a kneader, an extruder, or the like performing coarse pulverizing of the obtained molten-kneaded material, and then performing pulverization using a jet mill, and obtaining toner particles having a particle diameter in a target range by a wind classifier.

In more detail, the kneading and pulverizing method is divided into a kneading process of kneading the toner forming material including a binder resin and a pulverizing process of pulverizing the kneaded material. If necessary, a cooling process of cooling the kneaded material formed in the kneading process, and other processes may be included in the kneading and pulverizing method.

Each process according to the kneading and pulverizing method will be described in detail.

Kneading Process

In the kneading process, the toner forming materials including the binder resin are kneaded.

In the kneading process, an aqueous medium (for example, water such as distilled water and ion exchange water, alcohol, or the like) in an amount of from 0.5 parts by weight to 5 parts by weight with respect to 100 parts by weight of the toner forming material is preferably added.

Examples of a kneading machine used in the kneading process include a single screw extruder, a twin screw extruder, and the like. Hereinafter, a kneading machine including a sending screw portion and two kneading portions will be described as an example of the kneading machine with reference to the drawing, but it is not limited thereto.

Figure 2:
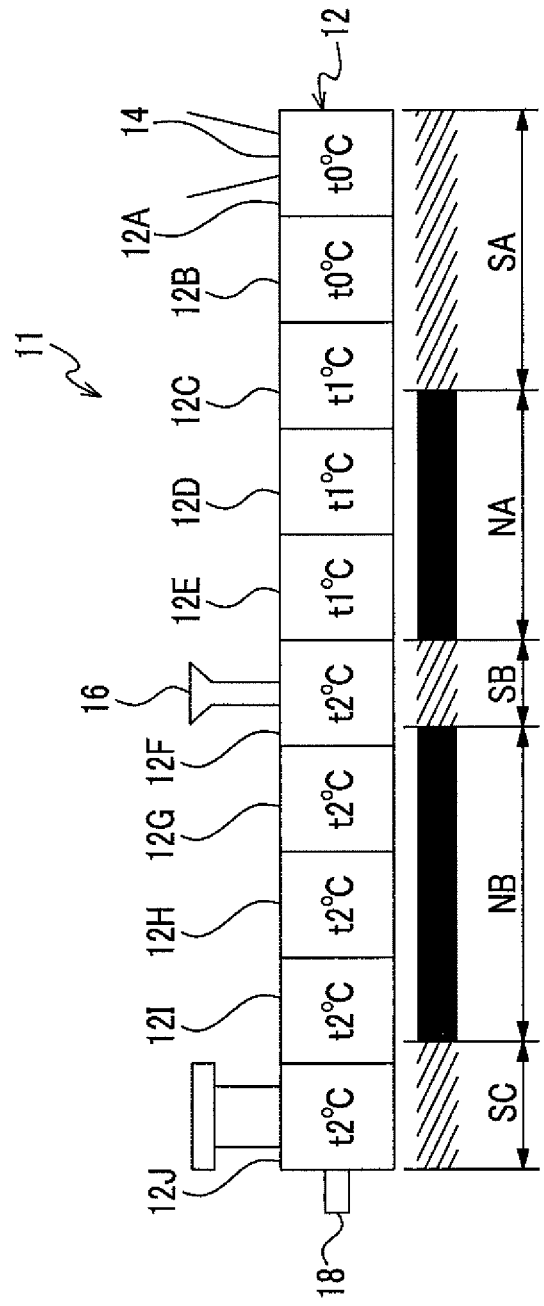
FIG. 2 is a diagram illustrating a state of a screw of an example of a screw extruder used in preparing a toner according to the exemplary embodiment.

FIG. 2 is a diagram illustrating a state of a screw of an example of a screw extruder used in the kneading process in the method for preparing the toner according to the exemplary embodiment.

A screw extruder 11 is configured by a barrel 12 provided with a screw (not shown), an injection port 14 through which a toner forming material that is a raw material of the toner is injected to the barrel 12, a liquid addition port 16 for adding an aqueous medium to the toner forming material in the barrel 12, and a discharge port 18 through which the kneaded material formed by kneading the toner forming material in the barrel 12 is discharged.

In order of distance from the injection port 14, the barrel 12 is divided into a sending screw portion SA which transports the toner forming material which is injected from the injection port 14 to a kneading portion NA, the kneading portion NA for molten kneading the toner forming material by a first kneading process, a sending screw portion SB which transports the toner forming material which is molten-kneaded in the kneading portion NA to a kneading portion NB, the kneading portion NB which is for molten kneading the toner forming material by a second kneading process to form a kneaded material, and a sending screw portion SC which transports the formed kneaded material to the discharge port 18.

In addition, in the inner portion of the barrel 12, a temperature control unit (not shown) which is different for each block is equipped. That is, the temperatures of blocks 12A to 12J may be controlled to be different from each other. FIG. 2 shows a state in which the temperatures of the blocks 12A and 12B are controlled to t0° C., the temperatures of the blocks 12C to 12E are controlled to t1° C., and the temperatures of the blocks 12F to 12J are controlled to t2° C. Therefore, the toner forming material in the kneading portion NA is heated to t1° C., and the toner forming material in the kneading portion NB is heated to t2° C.

When the toner forming material containing a binder resin, a colorant, a release agent, and the like is supplied to the barrel 12 from the injection port 14, the sending screw portion SA sends the toner forming material to the kneading portion NA. At this time, since the temperature of the block 12C is set to t1° C., the toner forming material melted by heating is fed to the kneading portion NA. In addition, since the temperatures of the blocks 12D and 12E are also set to t1° C., the toner forming material is molten-kneaded at a temperature of t1° C. in the kneading portion NA. The binder resin and the release agent are melted in the kneading portion NA and subjected to shearing with the screw.

Next, the toner forming material kneaded in the kneading portion NA is sent to the kneading portion NB by the sending screw portion SB.

In the sending screw portion SB, an aqueous medium is added to the toner forming material by injecting the aqueous medium to the barrel 12 from the liquid addition port 16. In addition, in FIG. 2, the aqueous medium is injected in the sending screw portion SB, but the invention is not limited thereto. The aqueous medium may be injected in the kneading portion NB, or may be injected in both of the sending screw portion SB and the kneading portion NB. That is, the position at which the aqueous medium is injected and the number of injection positions are selected as necessary.

As described above, due to the injection of the aqueous medium to the barrel 12 from the liquid addition port 16, the toner forming material in the barrel 12 and the aqueous medium are mixed, and the toner forming material is cooled by evaporative latent heat of the aqueous medium, whereby the temperature of the toner forming material is maintained.

Finally, the kneaded material formed by being molten-kneaded by the kneading portion NB is transported to the discharge port 18 by the sending screw portion SC, and is discharged from the discharge port 18.

By doing so, the kneading process using the screw extruder 11 shown in FIG. 2 is performed.

Cooling Process

The cooling process is a process of cooling the kneaded material which is formed in the kneading process, and in the cooling process, it is preferable to cool the kneaded material to 40° C. or lower from a temperature of the kneaded material at the time of completing the kneading process, at an average temperature falling rate of 4° C./sec or more. In a case where the cooling rate of the kneaded material is slow, the mixture (mixture of internal additives such as a colorant and a release agent) which is finely dispersed in the binder resin in the kneading process may be recrystallized and a dispersion diameter may become large in some cases. On the other hand, it is preferable to perform rapid cooling at the average temperature falling rate, since the dispersed state immediately after completion of the kneading process is maintained as it is. Moreover, the average temperature falling rate is an average value of a rate of the temperature falling from the temperature (for example, t2° C. when using the screw extruder 11 of FIG. 2) of the kneaded material at the time of completing the kneading process to 40° C.

In detail, as a cooling method of the cooling process, a method using a rolling roll in which cold water or brine is circulated and an insert type cooling belt is used. Moreover, in a case of performing the cooling using the method described above, a cooling rate thereof is determined by a rate of the rolling roll, a flow rate of the brine, a supplied amount of the kneaded material, a slab thickness at the time of rolling the kneaded material, and the like. The slab thickness is preferably from 1 mm to 3 mm.

Pulverization Process

The kneaded material cooled through the cooling process is pulverized through the pulverization process to form particles. In the pulverization process, for example, a mechanical pulverizer, a jet pulverizer, or the like is used.

Classification Process

If necessary, the particles obtained through the pulverization process may be classified through a classification process in order to obtain toner particles having a volume average particle diameter in a target range. In the classification process, a centrifugal classifier, an inertia-type classifier or the like, that have been used in the past, is used, and fine powder (particles having a particle diameter smaller than the target range) and coarse powder (particles having a particle diameter larger than the target range) are removed.

Externally Adding Process

The toner according to the exemplary embodiment is prepared by adding and mixing an external additive to the obtained toner particles in the same manner as in the aggregation and coalescence method.

Electrostatic Charge Image Developer

An electrostatic charge image developer according to the exemplary embodiment includes at least the toner according to the exemplary embodiment.

The electrostatic charge image developer according to the exemplary embodiment may be a single-component developer including only the toner according to the exemplary embodiment, or a two-component developer obtained by mixing the toner with a carrier.

The carrier is not particularly limited, and known carriers are exemplified. Examples of the carrier include a coated carrier in which surfaces of cores formed of a magnetic particle are coated with a coating resin; a magnetic particle dispersion-type carrier in which a magnetic particle is dispersed and blended in a matrix resin; and a resin impregnation-type carrier in which a porous magnetic particle is impregnated with a resin.

The magnetic particle dispersion-type carrier and the resin impregnation-type carrier may be carriers in which constituent particles of the carrier are cores and have a surface coated with a coating resin.

Examples of the magnetic particle include magnetic metals such as iron, nickel, and cobalt, and magnetic oxides such as ferrite and magnetite.

Examples of the conductive particles include particles of metals such as gold, silver, and copper, carbon black particles, titanium oxide particles, zinc oxide particles, tin oxide particles, barium sulfate particles, aluminum borate particles, and potassium titanate particles.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid copolymer, a straight silicone resin configured to include an organosiloxane bond or a modified product thereof, a fluororesin, polyester, polycarbonate, a phenol resin, and an epoxy resin.

The coating resin and the matrix resin may include additives such as a conductive material.

Herein, a coating method using a coating layer forming solution in which a coating resin and, if necessary, various additives are dissolved in an appropriate solvent is used to coat the surface of a core with the coating resin. The solvent is not particularly limited, and may be selected in consideration of the type of coating resin to be used coating suitability, and the like.

Specific examples of the resin coating method include a dipping method for dipping cores in a coating layer forming solution; a spraying method for spraying a coating layer forming solution to surfaces of cores; a fluid bed method for spraying a coating layer forming solution in a state in which cores are allowed to float by flowing air; and a kneader-coater method in which cores of a carrier and a coating layer forming solution are mixed with each other in a kneader-coater and the solvent is removed.

The mixing ratio (weight ratio) between the toner and the carrier in the two-component developer is preferably from 1:100 to 30:100, and more preferably from 3:100 to 20:100 (toner:carrier).

Image Forming Apparatus/Image Forming Method

An image forming apparatus and an image forming method according to the exemplary embodiment will be described.

The image forming apparatus according to the exemplary embodiment is equipped with an image holding member, a charging unit that charges a surface of the image holding member, an electrostatic charge image forming unit that forms an electrostatic charge image on the charged surface of the image holding member, a developing unit that contains an electrostatic charge image developer and develops the electrostatic charge image formed on the surface of the image holding member with the electrostatic charge image developer to form a toner image, a transfer unit that transfers the toner image formed on the surface of the image holding member onto a surface of a recording medium, and a fixing unit that fixes the toner image transferred onto the surface of the recording medium. In addition, as the electrostatic charge image developer, the electrostatic charge image developer according to the exemplary embodiment is applied.

In the image forming apparatus according to the exemplary embodiment, an image forming method (image forming method according to the exemplary embodiment) including a charging process of charging a surface of an image holding member, an electrostatic charge image forming process of forming an electrostatic charge image on the charged surface of the image holding member, a developing process of developing the electrostatic charge image formed on the surface of the image holding member with the electrostatic charge image developer according to the exemplary embodiment to form a toner image, a transfer process of transferring the toner image formed on the surface of the image holding member onto a surface of a recording medium, and a fixing process of fixing the toner image transferred onto the surface of the recording medium is performed.

As the image forming apparatus according to the exemplary embodiment, a known image forming apparatus is applied, such as a direct transfer-type apparatus that directly transfers a toner image formed on a surface of an image holding member onto a recording medium; an intermediate transfer-type apparatus that primarily transfers a toner image formed on a surface of an image holding member onto a surface of an intermediate transfer member, and secondarily transfers the toner image transferred onto the surface of the intermediate transfer member onto a surface of a recording medium; an apparatus that is provided with a cleaning unit that cleans a surface of an image holding member after transfer of a toner image and before charging; or an apparatus that is provided with an erasing unit that irradiates, after transfer of a toner image and before charging, a surface of an image holding member with erasing light for erasing.

In the case where the image forming apparatus according to the exemplary embodiment is an intermediate transfer-type apparatus, a transfer unit has, for example, an intermediate transfer member having a surface onto which a toner image is to be transferred, a primary transfer unit that primarily transfers the toner image formed on a surface of an image holding member onto the surface of the intermediate transfer member, and a secondary transfer unit that secondarily transfers the toner image transferred onto the surface of the intermediate transfer member onto a surface of a recording medium.

Moreover, in the image forming apparatus according to the exemplary embodiment, for example, a part including the developing unit may have a cartridge structure (process cartridge) that is detachable from the image forming apparatus. As the process cartridge, for example, a process cartridge that contains the electrostatic charge image developer according to the exemplary embodiment and is equipped with a developing unit is suitably used.

Hereinafter, an example of the image forming apparatus according to the exemplary embodiment will be described. However, the image forming apparatus is not limited thereto. Moreover, major portions shown in the drawing will be described, and description of other portions will be omitted.

Figure 3:
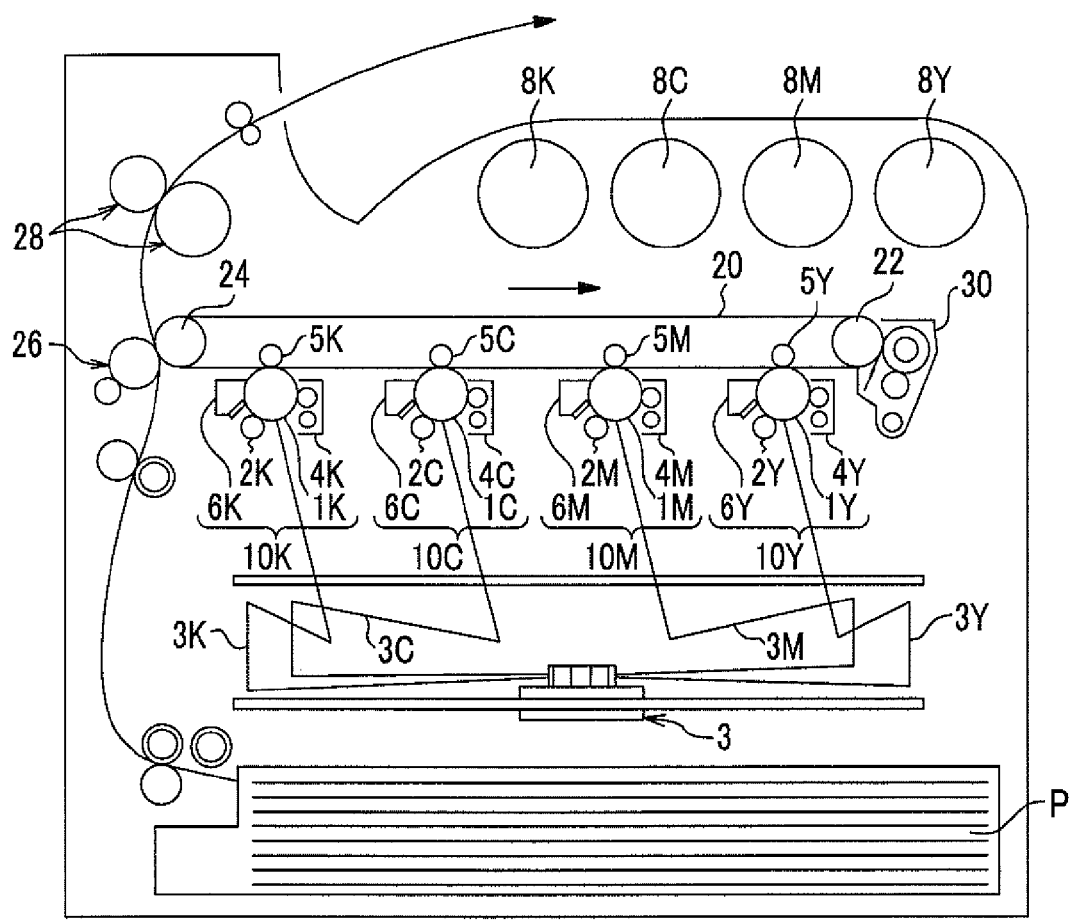
FIG. 3 is a schematic configuration view showing an image forming apparatus according to the exemplary embodiment.

FIG. 3 is a schematic configuration diagram showing the image forming apparatus according to the exemplary embodiment.

The image forming apparatus shown in FIG. 3 is equipped with first to fourth electrophotographic image forming units 10Y, 10M, 10C, and 10K (image forming units) that output yellow (Y), magenta (M), cyan (C), and black (K) images based on color-separated image data, respectively. These image forming units (hereinafter, simply referred to as "units" in some cases) 10Y, 10M, 10C, and 10K are arranged side by side at predetermined intervals in a horizontal direction. These units 10Y, 10M, 100, and 10K may be process cartridges that are detachable from the image forming apparatus.

An intermediate transfer belt 20 as an intermediate transfer member is installed above the units 10Y, 10M, 100, and 10K in the drawing to extend through the units. The intermediate transfer belt 20 is wound on a driving roll 22 and a support roll 24 contacting the inner surface of the intermediate transfer belt 20, which are disposed to be separated from each other on the left and right sides in the drawing, and travels in a direction toward the fourth unit 10K from the first unit 10Y. In the support roll 24, a force is applied in a direction in which it departs from the driving roll 22 by a spring or the like (not shown), and tension is given to the intermediate transfer belt 20 wound on both of the rolls. In addition, an intermediate transfer member cleaning device 30 opposed to the driving roll 22 is equipped on a surface of the intermediate transfer belt 20 on the image holding member side.

Developing devices (developing units) 4Y, 4M, 40, and 4K of the units 10Y, 10M, 100, and 10K are supplied with toner including four color toners, that is, a yellow toner, a magenta toner, a cyan toner, and a black toner contained in toner cartridges 8Y, 8M, 8C, and 8K, respectively.

The first to fourth units 10Y, 10M, 100, and 10K have the same configuration, and accordingly, only the first unit 10Y that is disposed on the upstream side in a traveling direction of the intermediate transfer belt to form a yellow image will be representatively described herein. Moreover, the same parts as in the first unit 10Y will be denoted by the reference numerals with magenta (M), cyan (C), and black (K) added instead of yellow (Y), and descriptions of the second to fourth units 10M, 100, and 10K will be omitted.

The first unit 10Y has a photoreceptor 1Y acting as an image holding member. Around the photoreceptor 1Y, a charging roll (an example of the charging unit) 2Y that charges a surface of the photoreceptor 1Y to a predetermined potential, an exposure device (an example of the electrostatic charge image forming unit) 3 that exposes the charged surface with laser beams 3Y based on a color-separated image signal to form an electrostatic charge image, a developing device (an example of the developing unit) 4Y that supplies a charged toner to the electrostatic charge image to develop the electrostatic charge image, a primary transfer roll (an example of the primary transfer unit) 5Y that transfers the developed toner image onto the intermediate transfer belt 20, and a photoreceptor cleaning device (an example of the cleaning unit) 6Y that removes the toner remaining on the surface of the photoreceptor 1Y after primary transfer, are disposed in sequence.

The primary transfer roll 5Y is disposed inside the intermediate transfer belt 20 to be provided at a position opposed to the photoreceptor 1Y. Furthermore, bias supplies (not shown) that apply a primary transfer bias are connected to the primary transfer rolls 5Y, 5M, 5C, and 5K, respectively. Each bias supply changes a transfer bias that is applied to each primary transfer roll under the control of a controller (not shown).

Hereinafter, the operation of forming a yellow image in the first unit 10Y will be described.

First, before the operation, the surface of the photoreceptor 1Y is charged to a potential of −600 V to −800 V by the charging roll 2Y.

The photoreceptor 1Y is formed by laminating a photosensitive layer on a conductive substrate (for example, volume resistivity at 20° C.: $1 \times 10^{-6}$ Ωcm or less). The photosensitive layer typically has high resistance (that is about the same as the resistance of a general resin), but has properties in which when laser beams 3Y are applied, the specific resistance of a part irradiated with the laser beams changes. Accordingly, the laser beams 3Y are output to the charged surface of the photoreceptor 1Y through the exposure device 3 in accordance with image data for yellow sent from the controller (not shown). The laser beams 3Y are applied to the photosensitive layer on the surface of the photoreceptor 1Y, whereby an electrostatic charge image of a yellow image pattern is formed on the surface of the photoreceptor 1Y.

The electrostatic charge image is an image that is formed on the surface of the photoreceptor 1Y by charging, and is a so-called negative latent image, that is formed by applying laser beams 3Y to the photosensitive layer so that the specific resistance of the irradiated part is lowered to cause charges to flow on the surface of the photoreceptor 1Y, while charges stay on a part to which the laser beams 3Y are not applied.

The electrostatic charge image formed on the photoreceptor 1Y is rotated up to a predetermined developing position with the travelling of the photoreceptor 1Y. The electrostatic charge image on the photoreceptor 1Y is visualized (developed) as a toner image at the developing position by the developing device 4Y.

The developing device 4Y contains, for example, an electrostatic charge image developer including at least a yellow toner and a carrier. The yellow toner is frictionally charged by being stirred in the developing device 4Y to have a charge with the same polarity (negative polarity) as the charge that is on the photoreceptor 1Y, and is thus held on the developer roll (an example of the developer holding member). By allowing the surface of the photoreceptor 1Y to pass through the developing device 4Y, the yellow toner electrostatically attaches to the latent image part having been erased on the surface of the photoreceptor 1Y, whereby the latent image is developed with the yellow toner. The photoreceptor 1Y having the yellow toner image formed thereon continuously travels at a predetermined rate and the toner image developed on the photoreceptor 1Y is transported to a predetermined primary transfer position.

When the yellow toner image on the photoreceptor 1Y is transported to the primary transfer position, a primary transfer bias is applied to the primary transfer roll 5Y and an electrostatic force toward the primary transfer roll 5Y from the photoreceptor 1Y acts on the toner image, whereby the toner image on the photoreceptor 1Y is transferred onto the intermediate transfer belt 20. The transfer bias applied at this time has the opposite polarity (+) to the toner polarity (−), and, for example, is controlled to +10 μA in the first unit 10Y by the controller (not shown).

On the other hand, the toner remaining on the photoreceptor 1Y is removed and collected by the photoreceptor cleaning device 6Y.

The primary transfer biases that are applied to the primary transfer rolls 5M, 5C, and 5K of the second unit 10M and the subsequent units are also controlled in the same manner as in the case of the first unit.

In this manner, the intermediate transfer belt 20 onto which the yellow toner image is transferred in the first unit 10Y is sequentially transported through the second to fourth units 10M, 10C, and 10K, and the toner images of respective colors are multiply-transferred in a superimposed manner.

The intermediate transfer belt 20 onto which the four color toner images have been multiply-transferred through the first to fourth units reaches a secondary transfer part that is configured of the intermediate transfer belt 20, the support roll 24 contacting the inner surface of the intermediate transfer belt, and a secondary transfer roll (an example of the secondary transfer unit) 26 disposed on the image holding surface side of the intermediate transfer belt 20. Meanwhile, a recording sheet (an example of the recording medium) P is supplied to a gap between the secondary transfer roll 26 and the intermediate transfer belt 20, that are brought into contact with each other, through a supply mechanism at a predetermined timing, and a secondary transfer bias is applied to the support roll 29. The transfer bias applied at this time has the same polarity (−) as the toner polarity (−), and an electrostatic force toward the recording sheet P from the intermediate transfer belt 20 acts on the toner image, whereby the toner image on the intermediate transfer belt 20 is transferred onto the recording sheet P. Moreover, in this case, the secondary transfer bias is determined depending on the resistance detected by a resistance detector (not shown) that detects the resistance of the secondary transfer part, and is voltage-controlled.

Thereafter, the recording sheet P is fed to a pressure-contacting part (nip portion) between a pair of fixing rolls in a fixing device (an example of the fixing unit) 28 so that the toner image is fixed to the recording sheet P, whereby a fixed image is formed.

Examples of the recording sheet P onto which a toner image is transferred include plain paper that is used in electrophotographic copying machines, printers, and the like. As a recording medium, an OHP sheet is also exemplified other than the recording sheet P.

The surface of the recording sheet P is preferably smooth in order to further improve smoothness of the image surface after fixing. For example, coating paper obtained by coating a surface of plain paper with a resin or the like, art paper for printing, and the like are suitably used.

The recording sheet P on which the fixing of the color image is completed is discharged toward a discharge portion, and a series of the color image forming operations ends.

Process Cartridge/Toner Cartridge

A process cartridge according to the exemplary embodiment will be described.

The process cartridge according to the exemplary embodiment is a process cartridge that is equipped with a developing unit that accommodates the electrostatic charge image developer according to the exemplary embodiment and develops an electrostatic charge image formed on a surface of an image holding member with the electrostatic charge image developer to form a toner image, and is detachable from an image forming apparatus.

The process cartridge according to the exemplary embodiment is not limited to the above-described configuration, and may be configured to include a developing device, and if necessary, at least one selected from other units such as an image holding member, a charging unit, an electrostatic charge image forming unit, and a transfer unit.

Hereinafter, an example of the process cartridge according to the exemplary embodiment will be shown. However, the process cartridge is not limited thereto. Moreover, major portions shown in the drawing will be described, and description of other portions will be omitted.

Figure 4:
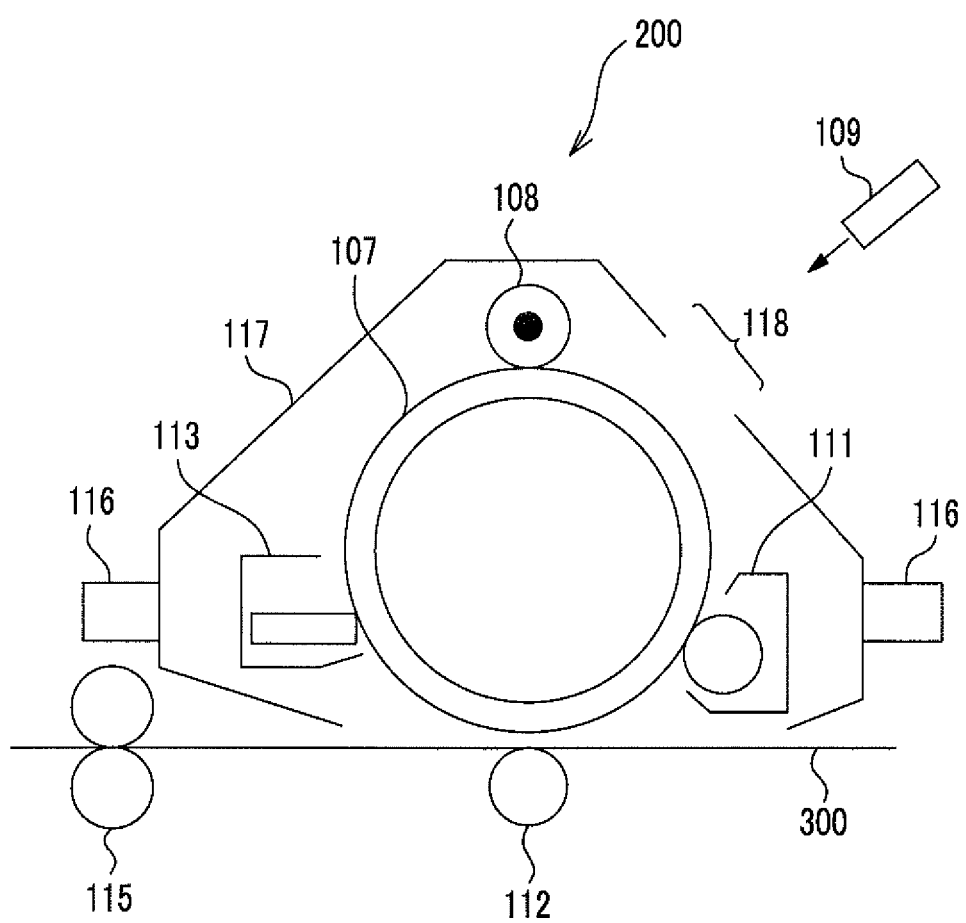
FIG. 4 is a schematic configuration view showing a process cartridge according to the exemplary embodiment.

FIG. 4 is a schematic diagram showing a configuration of the process cartridge according to the exemplary embodiment.

A process cartridge 200 shown in FIG. 4 is formed as a cartridge having a configuration in which a photoreceptor 107 (an example of the image holding member), and a charging roll 108 (an example of the charging unit), a developing device 111 (an example of the developing unit), and a photoreceptor cleaning device 113 (an example of the cleaning unit), which are equipped around the photoreceptor 107, are integrally combined and held by the use of, for example, a housing 117 equipped with a mounting rail 116 and an opening 118 for exposure.

In FIG. 4, the reference numeral 109 represents an exposure device (an example of the electrostatic charge image forming unit), the reference numeral 112 represents a transfer device (an example of the transfer unit), the reference numeral 115 represents a fixing device (an example of the fixing unit), and the reference numeral 300 represents a recording sheet (an example of the recording medium).

Next, a toner cartridge (developer cartridge) according to the exemplary embodiment will be described.

The toner cartridge according to the exemplary embodiment is a toner cartridge that accommodates the toner according to the exemplary embodiment and is detachable from an image forming apparatus. The toner cartridge accommodates a toner for replenishment to be supplied to the developing unit provided in the image forming apparatus.

Moreover, the image forming apparatus shown in FIG. 3 is an image forming apparatus that has such a configuration that the toner cartridges 8Y, 8M, 8O, and 8K are detachable therefrom, and the developing devices 4Y, 4M, 4C, and 4K are connected to the toner cartridges corresponding to the respective developing devices (colors) through toner supply tubes (not shown), respectively. In addition, in a case where the toner accommodated in the toner cartridge runs low, the toner cartridge is replaced.

EXAMPLES

Hereinafter, the exemplary embodiment will be more specifically described with reference to Examples and Comparative Examples, but the exemplary embodiment is not limited to the following Examples. Moreover, "parts" and "%" are based on weight unless specified otherwise.

Preparation of Silica Particle Suspension 1

198 g of methanol and 35 g of 10% ammonia water ($NH_4OH$) are put in a 1.5 L reaction vessel made of glass equipped with a stirrer, a dropping nozzle, and a thermometer, and mixed, whereby an alkali catalyst solution is obtained.

After the alkali catalyst solution is adjusted to 25° C., while stirring, the flow rate is adjusted such that the amount of $NH_3$ becomes 0.27 moles with respect to 1 mole of the total supply amount of tetraalkoxysilane supplied per minute, addition of 100 g of tetramethoxysilane (TMOS) and 79 g of 3.8% ammonia water (NH$_4$OH) is started, and dropwise addition is performed for 60 minutes, whereby a silica particle suspension 1 having an average particle diameter of 170 nm is obtained.

Preparation of Silica Particle Suspension 2

A silica particle suspension 2 having an average particle diameter of 85 nm is obtained in the same manner as in Preparation of Silica Particle Suspension 1 except that the temperature of the alkali catalyst solution is changed from 25° C. to 35° C.

Preparation of Silica Particle Suspension 3

A silica particle suspension 3 having an average particle diameter of 57 nm is obtained in the same manner as in Preparation of Silica Particle Suspension 1 except that the temperature of the alkali catalyst solution is changed from 25° C. to 38° C.

Preparation of Silica Particle Suspension 4

A silica particle suspension 4 having an average particle diameter of 43 nm is obtained in the same manner as in Preparation of Silica Particle Suspension 1 except that the temperature of the alkali catalyst solution is changed from 25° C. to 43° C.

Preparation of Silica Particle Suspension 5

A silica particle suspension 5 having an average particle diameter of 34 nm is obtained in the same manner as in Preparation of Silica Particle Suspension 1 except that the temperature of the alkali catalyst solution is changed from 25° C. to 50° C.

Preparation of Silica Particle Suspension 6

A silica particle suspension 6 having an average particle diameter of 128 nm is obtained in the same manner as in Preparation of Silica Particle Suspension 1 except that the temperature of the alkali catalyst solution is changed from 25° C. to 30° C.

Example A1

Preparation of Irregular Shape Inorganic Particles 1

After the silica particle suspension 1 and the silica particle suspension 3 are mixed, the temperature of the mixture is adjusted to 30° C. while stirring, then, 0.2 g of zinc chloride is added thereto, and the mixture is continuously stirred for 60 minutes.

Then, 300 g of the solvent is distilled off by a heating distillation, and after 300 g of pure water is added thereto, the mixture is dried by a freeze-drier, whereby hydrophilic irregular shape silica particles are obtained.

Furthermore, 7 g of hexamethyl disilazane is added to 36 g of the hydrophilic irregular shape silica particles, then, the mixture is reacted at 150° C. for 2 hours, and the silica particles are subjected to a hydrophobization treatment, whereby irregular shape inorganic particles 1 which are hydrophobic silica particles are obtained.

A ratio of a distance between the center of a circumscribed rectangle and the center of gravity of a projected image and an absolute maximum length (long side), and a ratio of a length of a long side and a length of a short side of the circumscribed rectangle, of the irregular shape inorganic particles 1 are shown in Table 1.

Example A2

Preparation of Irregular Shape Inorganic Particles 2

Irregular shape inorganic particles 2 are obtained in the same manner as in Example 1 except that the silica particle suspension 3 is changed to the silica particle suspension 4.

A ratio of a distance between the center of a circumscribed rectangle and the center of gravity of a projected image and an absolute maximum length (long side), and a ratio of a length of a long side and a length of a short side of the circumscribed rectangle, of the irregular shape inorganic particles 2 are shown in Table 1.

Example A3

Preparation of Irregular Shape Inorganic Particles 3

Irregular shape inorganic particles 3 are obtained in the same manner as in Example 1 except that the silica particle suspension 3 is changed to the silica particle suspension 2.

A ratio of a distance between the center of a circumscribed rectangle and the center of gravity of a projected image and an absolute maximum length (long side), and a ratio of a length of a long side and a length of a short side of the circumscribed rectangle, of the irregular shape inorganic particles 3 are shown in Table 1.

Comparative Example A1

Preparation of Irregular Shape Inorganic Particles 4

Irregular shape inorganic particles 4 are obtained in the same manner as in Example 1 except that the silica particle suspension 3 is changed to the silica particle suspension 6.

A ratio of a distance between the center of a circumscribed rectangle and the center of gravity of a projected image and an absolute maximum length (long side), and a ratio of a length of a long side and a length of a short side of the circumscribed rectangle, of the irregular shape inorganic particles 4 are shown in Table 1.

Comparative Example A2

Preparation of Irregular Shape Inorganic Particles 5

Irregular shape inorganic particles 5 are obtained in the same manner as in Example 1 except that the silica particle suspension 3 is changed to the silica particle suspension 5.

A ratio of a distance between the center of a circumscribed rectangle and the center of gravity of a projected image and an absolute maximum length (long side), and a ratio of a length of a long side and a length of a short side of the circumscribed rectangle, of the irregular shape inorganic particles 5 are shown in Table 1.

TABLE 1

|  | Irregular shape inorganic particles | Distance between the center and the center of gravity/long side | Long side/short side ratio |
|---|---|---|---|
| Example A1 | 1 | 1/14.6 | 1.31 |
| Example A2 | 2 | 1/15.7 | 1.23 |
| Example A3 | 3 | 1/16.2 | 1.45 |
| Comparative Example A1 | 4 | 1/30.5 | 1.72 |
| Comparative Example A2 | 5 | 1/17.3 | 1.17 |

In Table 1, "a distance between the center and the center of gravity/long side" represents "a ratio of a distance between the center of a circumscribed rectangle and the center of gravity of a projected image and an absolute maximum length (long side)", and "a long side/short side ratio" represents "a ratio of a length of a long side and a length of a short side of a circumscribed rectangle".

Example B1

Manufacture of Toner 1

A mixture of 100 parts of styrene-butyl acrylate copolymer (weight average molecular weight (Mw) of 150,000, copolymerization ratio of 80:20), 5 parts of carbon black (Mogul L: manufactured by Cabot Corporation), and 6 parts of carnauba wax is kneaded by an extruder, and after being pulverized using a jet mill, a spheroidization treatment by hot air is performed using KRYPTRON (manufactured by Kawasaki Heavy Industries, Ltd.), and classification is performed using a wind classifier, whereby toner particles having a particle diameter of 6.2 μm are obtained.

1.2 parts of the irregular shape inorganic particles 1 obtained in Example A1 are added to 100 parts of the toner particles, and mixed using a HENSCHEL MIXER, whereby a toner 1 is obtained.

Manufacture of Carrier 2.8 parts of styrene-methyl methacrylate copolymer (Mw: 35,000), 0.2 parts of carbon black are put into 50 parts of toluene, and the mixture is dispersed for 30 minutes using a sand mill, whereby a dispersion is obtained. 23 parts of the dispersion are mixed with 100 parts of ferrite particles (volume average particle diameter of 30 μm), and the mixture is stirred for 30 minutes in a vacuum deaeration kneader while heating to 80° C. Then, the mixture is stirred while reducing pressure, and the solvent is removed. The taken out mixture is sieved with a 75 μm mesh to remove a coarse content, whereby a carrier is obtained.

Electrostatic Charge Image Developer 40 parts of the toner 1 and 350 parts of the carrier are stirred for 30 minutes at 35 rpm using a V-blender, then, the mixture is sieved with a 212 μm mesh to remove a coarse content, whereby, an electrostatic charge image developer (hereinafter, referred to as "developer") 1 is obtained.

Example B2

A toner 2 is obtained in the same manner as in Example B1 except that the irregular shape inorganic particles 2 is used instead of the irregular shape inorganic particles 1. A developer 2 is obtained in the same manner as in Example B1 except that the toner 2 is used instead of the toner 1.

Example B3

A toner 3 is obtained in the same manner as in Example B1 except that the irregular shape inorganic particles 3 is used instead of the irregular shape inorganic particles 1. A developer 3 is obtained in the same manner as in Example B1 except that the toner 3 is used instead of the toner 1.

Example B4

1.0 part of the irregular shape inorganic particles 1 obtained in Example A1 and 0.2 parts of colloidal silica (R972 manufactured by Nippon Aerosil Co., Ltd.) are added to 100 parts of the toner particles obtained in Example B1, and mixed using a Henschel mixer, whereby a toner 4 is obtained. A developer 4 is obtained in the same manner as in Example B1 except that the toner 4 is used instead of the toner 1.

Example B5

1.0 part of the irregular shape inorganic particles 3 obtained in Example A3 and 0.2 parts of colloidal silica (R972 manufactured by Nippon Aerosil Co., Ltd.) are added to 100 parts of the toner particles obtained in Example B1, and mixed using a HENSCHEL MIXER, whereby a toner 5 is obtained. A developer 5 is obtained in the same manner as in Example B1 except that the toner 5 is used instead of the toner 1.

Comparative Example B1

A toner 6 is obtained in the same manner as in Example B1 except that the irregular shape inorganic particles 4 is used instead of the irregular shape inorganic particles 1. A developer 6 is obtained in the same manner as in Example B1 except that the toner 6 is used instead of the toner 1.

Comparative Example B2

A toner 7 is obtained in the same manner as in Example B1 except that the irregular shape inorganic particles 5 is used instead of the irregular shape inorganic particles 1. A developer 7 is obtained in the same manner as in Example B1 except that the toner 7 is used instead of the toner 1.

Comparative Example B3

0.48 parts of the irregular shape inorganic particles 1 obtained in Example A1 and 0.72 parts of colloidal silica (R972 manufactured by Nippon Aerosil Co., Ltd.) are added to 100 parts of the toner particles obtained in Example B1, and mixed using a HENSCHEL MIXER, whereby a toner 8 is obtained. A developer 8 is obtained in the same manner as in Example B1 except that the toner 8 is used instead of the toner 1.

Evaluation

The following evaluations are performed on Examples B1 to B5 and Comparative Examples B1 to B3. The results are shown in Table 2.

Photoreceptor Filming

Continuous outputs of 5,000 papers with the developer obtained in each of Examples and Comparative Examples are performed with the amount of toner on a recording medium of 0.2 g/m$^2$ under 10° C./15% RH environment, using an image forming apparatus "remodeled DOCUPRINT C3200" (in which a process speed is adjusted to 320 mm/s and a fixing device is removed, and which is remodeled so as to be operated in the same manner as in an usual image forming apparatus until a transfer process), and evaluation is performed by quantifying in percentage the number of prints in which an image defect due to filming is generated.

Evaluation Criteria

A: Image defect by filming is less than 0.5%.
B: Image defect by filming is equal to or greater than 0.5% and less than 2.0%.
C: Image defect by filming is equal to or greater than 2.0% and less than 5.0%.
D: Image defect by filming is equal to or greater than 5.0%.

Photoreceptor Scratch

After the continuous outputs of images for a filming evaluation, the image forming apparatus is disassembled, the photoreceptor thereof is removed, and the surface of the removed photoreceptor is observed using a color laser microscope "VK-9700" (manufactured by Keyence Corporation), and the state of scratches on the surface is visually evaluated.

Evaluation Criteria
A: Scratches are not observed.
B: Fine scratches are slightly observed.
C: Fine scratches are slightly observed, but, streaky scratches are not observed.
D: Streaky scratches are significantly observed.

jected image and being perpendicular to the absolute maximum length are short sides, and the center of gravity of the projected image, B represents the absolute maximum length, C represents a length of a long side of the circumscribed rectangle, and D represents a length of a short side of the circumscribed rectangle.

TABLE 2

|  | Irregular shape inorganic particles | Distance between the center and the center of gravity/long side | Long side/short side ratio | Existing amount | Photoreceptor filming | Photoreceptor scratch |
|---|---|---|---|---|---|---|
| Example B1 | 1 | 1/14.6 | 1.31 | 75% by number | A | A |
| Example B2 | 2 | 1/15.7 | 1.23 | 75% by number | A | B |
| Example B3 | 3 | 1/16.2 | 1.45 | 75% by number | A | B |
| Example B4 | 1 | 1/14.6 | 1.31 | 60% by number | A | B |
| Example B5 | 3 | 1/16.2 | 1.45 | 60% by number | A | C |
| Comparative Example B1 | 4 | 1/30.5 | 1.72 | 75% by number | A | D |
| Comparative Example B2 | 5 | 1/17.3 | 1.17 | 75% by number | A | D |
| Comparative Example B3 | 1 | 1/14.6 | 1.31 | 30% by number | A | D |

In Table 2, "a distance between the center and the center of gravity/long side" represents "a ratio of a distance between the center of a circumscribed rectangle and the center of gravity of a projected image and an absolute maximum length (long side)", "a long side/short side ratio" represents "a ratio of a length of a long side and a length of a short side of a circumscribed rectangle", and "an existing amount" represents "a proportion of the irregular shape inorganic particles according to the exemplary embodiment in the external additive".

From Table 2, it is found that the photoreceptor filming is prevented in any of Examples and Comparative Examples, and the irregular shape inorganic particles 1 to 5 functions as an abrasive. In addition, it is found that in Examples B1 to B5, photoreceptor scratch is prevented, and an occurrence of uneven wear is prevented compared to Comparative Examples B1 to B3.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An inorganic particle comprising:
   inorganic particles having irregular shape and satisfying the following formulas (1) and (2), $$1/17 \leq A/B \leq 1/13 \quad (1)$$

$$1.2 \leq C/D \leq 1.5 \quad (2)$$

wherein A represents a distance between the center of a circumscribed rectangle, in which lines sandwiching a projected image and being parallel to an absolute maximum length of the projected image of inorganic fine particles are long sides and lines sandwiching the pro- 2. The inorganic particle according to claim 1, wherein the A/B is in a range of $1/15$ to $1/14$.

3. The inorganic particle according to claim 1, wherein the inorganic particles have a first granular portion and a second granular portion.

4. The inorganic particle according to claim 1, that is sol-gel silica.

5. An electrostatic charge image developing toner comprising:
   toner particles; and
   an external additive including the inorganic particles according to claim 1,
   wherein a proportion of the inorganic particles in the external additive is equal to or greater than 50% by number.

6. The electrostatic charge image developing toner according to claim 5,
   wherein A/B of the inorganic particle is in a range of $1/15$ to $1/14$.

7. The electrostatic charge image developing toner according to claim 5,
   wherein the inorganic particle has a first granular portion and a second granular portion.

8. The electrostatic charge image developing toner according to claim 5,
   wherein the inorganic particles have an average equivalent circle diameter of 0.05 μm to 1.5 μm.

9. The electrostatic charge image developing toner according to claim 5,
   wherein the inorganic particles have an average equivalent circle diameter of 0.08 μm to 1.5 μm.

10. An electrostatic charge image developer comprising:
    the electrostatic charge image developing toner according to claim 5; and
    an electrostatic charge image developing carrier.

11. A developer cartridge comprising:
    a container that accommodates the electrostatic charge image developer according to claim 10,
    wherein the cartridge is detachable from an image forming apparatus.

12. A process cartridge comprising:
    a developing unit that accommodates the electrostatic charge image developer according to claim 10 and develops an electrostatic charge image formed on a surface of an image holding member as a toner image with the electrostatic charge image developer, wherein the process cartridge is detachable from an image forming apparatus.

13. An image forming apparatus comprising:

an image holding member;

a charging unit that charges a surface of the image holding member;

an electrostatic charge image forming unit that forms an electrostatic charge image on a surface of a charged image holding member;

a developing unit that contains the electrostatic charge image developer according to claim 10 and develops an electrostatic charge image formed on the surface of the image holding member as a toner image with the electrostatic charge image developer;

a transfer unit that transfers the toner image formed on the surface of the image holding member to a surface of a recording medium; and a fixing unit that fixes the toner image transferred to the surface of the recording medium.

* * * * *